(12) United States Patent
Maeda et al.

(10) Patent No.: US 6,480,804 B2
(45) Date of Patent: *Nov. 12, 2002

(54) CHARACTERISTIC EXTRACTION APPARATUS FOR MOVING OBJECT AND METHOD THEREOF

(75) Inventors: Yoshiharu Maeda, Kanagawa (JP); Minoru Sekiguchi, Kanagawa (JP); Hirohisa Naito, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/339,824

(22) Filed: Jun. 25, 1999

(65) Prior Publication Data

US 2002/0143490 A1 Oct. 3, 2002

(30) Foreign Application Priority Data

Nov. 18, 1998 (JP) .............................. 10-328075

(51) Int. Cl.⁷ .......................... G06M 7/00; G06F 15/00
(52) U.S. Cl. ............................... 702/150; 1/1; 345/418; 377/6; 705/10
(58) Field of Search ................ 702/92, 94, 150, 702/155; 340/990; 382/103, 104; 1/1; 345/418; 377/16; 705/10

(56) References Cited

U.S. PATENT DOCUMENTS

| | | | | |
|---|---|---|---|---|
| 5,926,518 A | * | 7/1999 | Asokawa | 377/6 |
| 6,008,812 A | * | 12/1999 | Ueda et al. | 345/418 |
| 6,098,048 A | * | 8/2000 | Dashesky et al. | 705/10 |
| 6,141,435 A | * | 10/2000 | Naoi et al. | 382/104 |
| 6,191,707 B1 | * | 2/2001 | Taniguchi et al. | 1/1 |

FOREIGN PATENT DOCUMENTS

| | | |
|---|---|---|
| EP | 0 803 705 | 10/1997 |
| EP | 0 803 707 | 10/1997 |
| JP | 63-10300 | 1/1988 |
| JP | 4-117823 | 4/1992 |
| JP | 8-137916 | 5/1996 |
| JP | 9-247730 | 9/1997 |
| JP | 10-260053 | 9/1998 |

* cited by examiner

*Primary Examiner*—John S. Hilten
*Assistant Examiner*—John Le
(74) *Attorney, Agent, or Firm*—Staas & Halsey LLP

(57) ABSTRACT

A characteristic extraction apparatus relates location data about a location which a moving object, such as a human being, etc., visits, to situation data representing a situation at a time when the moving object visits the location and records the data. Then, it analyzes the recorded data, extracts the characteristic, such as a preference, a movement pattern, etc., of the moving object, and presents it to a user.

14 Claims, 22 Drawing Sheets

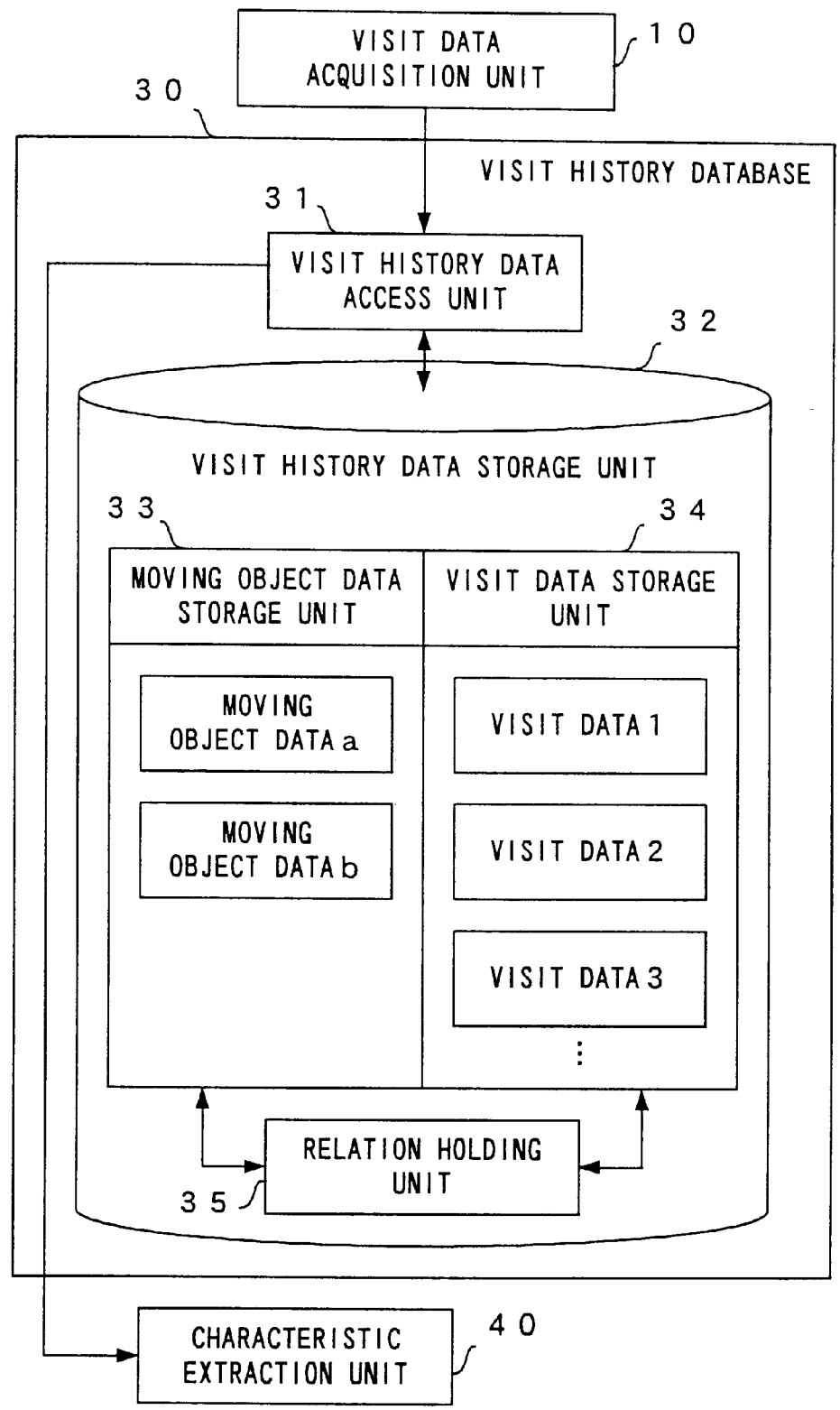
F I G. 10

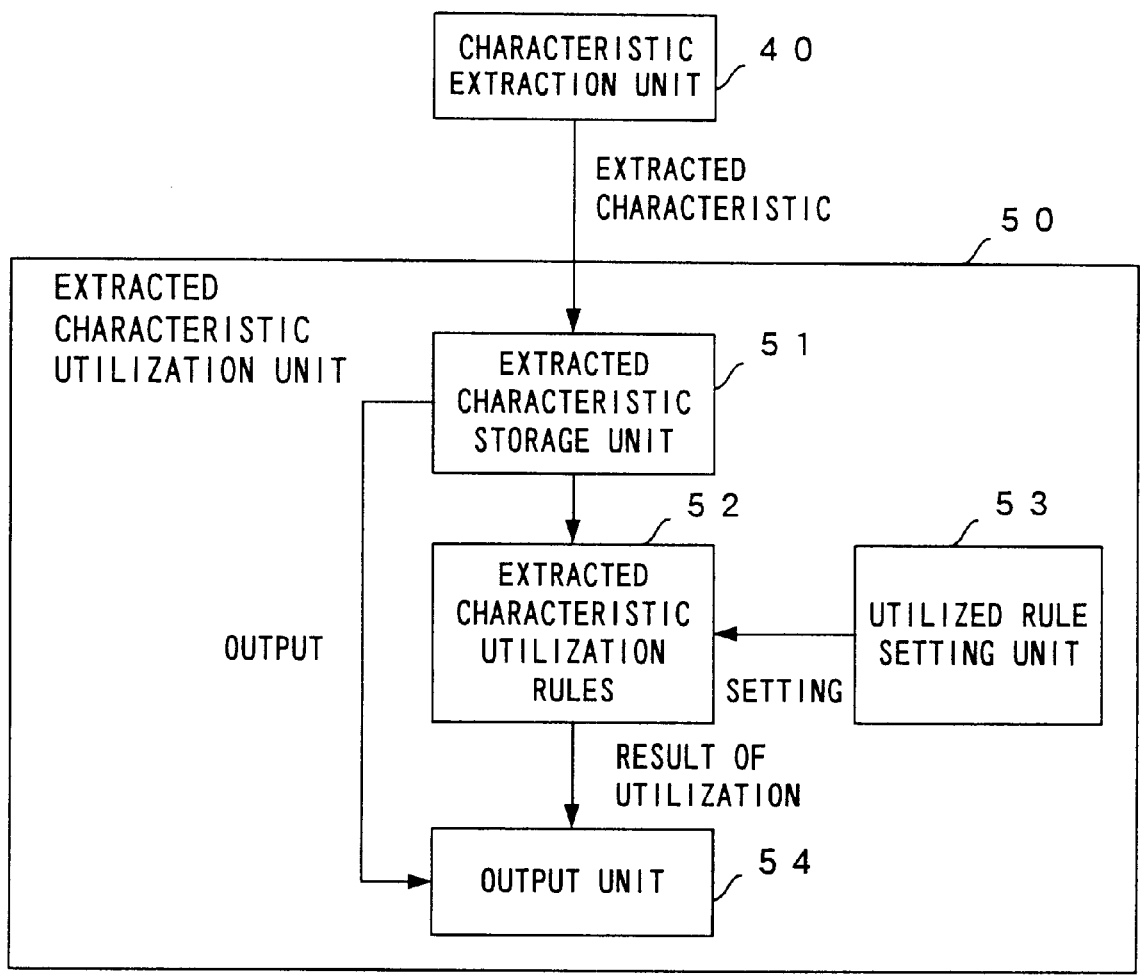
F I G. 1 2

| LOCATION ID | EAST LONGITUDE | NORTH LATITUDE | LARGE CATEGORY | SMALL CATEGORY |
|---|---|---|---|---|
| Pos 1 | 139.40 | 35.37 | FOR INDIVIDUAL | HOME |
| Pos 2 | 139.65 | 35.40 | FOR INDIVIDUAL | OFFICE |
| Pos 3 | 138.65 | 35.45 | MEAL | JAPANESE DISH |
| Pos 4 | 138.71 | 35.40 | MEAL | CHINESE DISH |
| Pos 5 | 139.30 | 35.60 | MEAL | WESTERN DISH |
| Pos 6 | 138.90 | 35.10 | RECREATION | AMUSEMENT PARK |
| Pos 7 | 138.10 | 34.90 | FOR INDIVIDUAL | PARENT'S HOME |

FIG. 17

| DATA No | LOCA-TION ID | DATE OF VISIT | DAY OF WEEK OF VISIT | TIME OF VISIT | PREVIOUS LOCATION ID | TIME OF DEPARTURE FROM PREVIOUS LOCATION | DATA ACQUISITION CONDITIONS/EVENT |
|---|---|---|---|---|---|---|---|
| 1 | Pos1 | 9/16 | Wed | 20:30 | Pos4 | 20:10 | EXITING, MIDNIGHT(0:00), ENTERING |
| 2 | Pos2 | 9/17 | Thu | 8:00 | Pos1 | 7:10 | EXITING, NOON(12:00), ENTERING |
| 3 | Pos5 | 9/17 | Thu | 19:00 | Pos2 | 18:00 | EXITING, MEAL, ENTERING |
| 4 | Pos1 | 9/17 | Thu | 20:40 | Pos3 | 20:00 | EXITING, MIDNIGHT(0:00), ENTERING |
| 5 | Pos2 | 9/18 | Fri | 8:15 | Pos1 | 7:20 | EXITING, NOON(12:00), ENTERING |
| 6 | Pos3 | 9/18 | Fri | 19:10 | Pos2 | 18:30 | EXITING, MEAL, ENTERING |
| 7 | Pos1 | 9/18 | Fri | 21:00 | Pos4 | 20:05 | EXITING, MIDNIGHT(0:00), ENTERING |
| 8 | Pos6 | 9/19 | Sat | 10:30 | Pos1 | 10:00 | EXITING, NOON(12:00), ENTERING |
| 9 | Pos5 | 9/19 | Sat | 20:00 | Pos6 | 18:45 | EXITING, MEAL, ENTERING |
| 10 | Pos7 | 9/19 | Sat | 22:00 | Pos5 | 21:30 | EXITING, MIDNIGHT(0:00), ENTERING |
| 11 | Pos4 | 9/20 | Sun | 19:30 | Pos7 | 18:50 | EXITING, MEAL, ENTERING |
| 12 | Pos1 | 9/20 | Sun | 20:30 | Pos4 | 20:00 | EXITING, MIDNIGHT(0:00), ENTERING |
| 13 | Pos2 | 9/21 | Mon | 8:10 | Pos1 | 7:15 | EXITING, NOON(12:00), ENTERING |
| 14 | Pos5 | 9/21 | Mon | 19:00 | Pos2 | 18:40 | EXITING, MEAL, ENTERING |

FIG. 18

| LOCATION ID | FREQUENCY OF VISITS | FREQUENTLY VISITED LOCATION | ATTRIBUTE OF LOCATION |
| --- | --- | --- | --- |
| Pos 1 | 4 | ○ | HOME |
| Pos 2 | 3 | ○ | OFFICE |
| Pos 3 | 3 | ○ | WESTERN DISH |
| Pos 4 | 1 | × | JAPANESE DISH |
| Pos 5 | 1 | × | CHINESE DISH |
| Pos 6 | 1 | × | AMUSEMENT PARK |
| Pos 7 | 1 | × | PARENT'S HOME |

FIG. 19

| DATA No | LOCATION ID | DAY OF WEEK OF VISIT | TIME OF VISIT | PREVIOUS LOCATION ID | TIME OF DEPARTURE FROM PREVIOUS LOCATION |
|---|---|---|---|---|---|
| 2 | Pos 2 | Thu | 8:00 | Pos 1 | 7:10 |
| 5 | Pos 2 | Fri | 8:15 | Pos 1 | 7:20 |
| 13 | Pos 2 | Mon | 8:10 | Pos 1 | 7:15 |

F I G. 2 0

| DATA No | LOCATION ID | DATE OF VISIT | TIME OF VISIT | PREVIOUS LOCATION ID | ATTRIBUTE OF LOCATION |
|---|---|---|---|---|---|
| 3 | Pos 5 | 9/17 | 19:00 | Pos 2 | WESTERN DISH |
| 6 | Pos 3 | 9/18 | 19:10 | Pos 2 | JAPANESE DISH |
| 9 | Pos 5 | 9/19 | 20:00 | Pos 6 | WESTERN DISH |
| 11 | Pos 4 | 9/20 | 19:30 | Pos 1 | CHINESE DISH |
| 14 | Pos 5 | 9/21 | 19:00 | Pos 2 | WESTERN DISH |

FIG. 21

| LOCATION ID | NUMBER OF VISITORS | RATIO OF FEMALES TO VISITORS | RATIO OF MINORITIES TO VISITORS |
|---|---|---|---|
| Pos A | 1000 | 80% | 50% |
| Pos B | 500 | 40% | 5% |

FIG. 22

CHARACTERISTIC EXTRACTION APPARATUS FOR MOVING OBJECT AND METHOD THEREOF

BACKGROUND OF THE INVENTION

1. Field of the Invention

The present invention relates to a technology to automatically extract the characteristic of a moving object, such as a human being, animal, article, etc., and in particular, to an apparatus and method for extracting the characteristic, such as a moving pattern, preference, etc., of a moving object by storing and collecting the visit history and visit situations of locations as visit history data and analyzing the visit history data in a case where a moving object moves in a space and visits a certain location.

2. Description of the Related Art

The location of a moving object can be measured with the following methods.

(1) In radio cut navigation a global positioning system (GPS) or a differential GPS (D-GPS) using radio waves transmitted from an artificial satellite is utilized.

(2) In dead reckoning navigation the direction and distance are calculated utilizing both a directional sensor, such as a gyro, etc., and a speed sensor.

(3) A hybrid method combines navigation (1) and (2).

(4) A method in which an apparatus with a function for specifying a position is installed in a location to be measured in advance (Japanese Patent Application Publication No. 63-010300).

(5) A method in which a personal handyphone system (PHS) is utilized.

Generally speaking, the method by which the most accurate position is measured is method (4), and the method by which the least accurate position is measured is method (5). Although the format of position information to be measured varies depending on the position measurement method, the position information is expressed by the direction at a certain location and a distance from the location, a device identification ID by which a location can be specified, etc.

There are two kinds of systems in which the position of a moving object is measured using the above-described measurement methods and the position information used: a) a navigation system for moving objects, and b) a position management system for moving objects.

The navigation system for moving objects is a route guiding system which assists a moving object move to a destination. This system comprises a position measurement unit for measuring a current position, road map data which are stored in a storage medium, a map matching unit for matching the measured current position with the road map data, a route plan unit for planning a route to a specific destination and a guidance unit for guiding a user according to the planned route, an output unit for outputting data utilizing a display or synthesized voice, etc.

Since the navigation system has the above-described configuration, the current position of a moving object can be displayed on a screen and the moving object can be guided to a specific destination according to a planned moving route when the moving object moves toward the destination. The navigation systems available for moving objects include a car navigation system, a navigation system which is used in ships, etc.

The position management system for moving objects is a system in which the position of a moving object is managed by another user who is not the moving object itself (in most cases, a position management center) by acquiring the current position of the moving object. This system is comprised of a position measurement unit for measuring a current position, a position information transmitting unit for transmitting the measured position information to a position management center, a position management apparatus for managing the position of the moving object using the transmitted position information, etc.

Examples of such a system include Japanese Application Publication No. 4-117823 "Moving Object Position Management Apparatus Utilizing a Mobile Communication System and Method thereof" and Japanese Patent Application Publication No. 9-247730 "Position Detection Apparatus and Method thereof". The system of the Japanese Patent Application Publication No. 4-117823 is a moving object position management system for measuring the position of a moving object using a GPS and transmitting the measured result in a radio transmission system. The system of the Japanese Patent Application Publication No. 9-247730 detects the position information about a moving object and performs the position management of the moving object by making the moving object (an aged person who has wandered off, etc.) carry both a GPS and a PHS. Such a position management system of moving objects is used to collectively manage the position of company vehicles, such as taxis, express delivery vans, etc., within a certain area, or the position of people, such as salespersons, customer engineers, etc.

The method for collecting the interest information, etc. of a moving object by analyzing the moving situation data of the moving object includes Japanese Patent Application Publication No. 8-137916 "Customer Interest Information Collection Method and Apparatus thereof". This automatically collects the moving situation of a customer from a store using a transmitting and receiving device, and analyzes such data as customer interest information. The moving situation of the customer is measured by installing a transmitting apparatus for transmitting a different transmitting device identification ID to positions in a store and by having the customer carry a receiving device. The moving situations of the customer are collected as customer interest information related to commodity purchase information, customer attribute information, etc., of the customer.

Generally speaking, since when a moving object visits a location, the moving object moves to the location with a certain purpose in mind and has an intention to perform a specific activity, the visited location is closely related to the activity purpose of the moving object, and the activity is further related to the characteristics (for example, a routine moving pattern, preference, interest, etc.) and the attributes (for example, sex, age, etc.) of the moving object. Therefore, the characteristics and attributes of the moving object can be extracted by measuring the position information of the moving object, and collecting and analyzing the history of visited locations.

Using the above-described technologies, the object of the navigation system is to perform route guidance to a certain destination using both position information obtained by the position measurement unit and map information data. The object of the position management system is for a position management center to monitor and manage the current position of a moving object. Therefore, the navigation system and the position management system alone cannot extract the characteristics of the moving object.

The appratus of the Japanese Patent Application Publication No. 8-137916 measures the movement data of a customer in a store by utilizing distinguishable transmitting devices in the positions in a store and a receiving device carried by the customer, relates the measured data to both the commodity purchase information and customer attribute information, and collects the customer interest information of the customer. However, this apparatus aims to collect customer interest information only in a limited area within a store, and it cannot measure the movement data of the customer outside the store where a transmitting device is not installed. Since the apparatus has no information about outside the store, it cannot operate outside the store.

SUMMARY OF THE INVENTION

The present invitation has such a background, and an object of the present invention is to provide an apparatus and method for extracting characteristics, such as preference, a pattern of location visits, etc. of a specific moving object by acquiring the location data of a specific location which the moving object visits, including locations within stores and other locations which the moving object can move to and visit, referencing the data with its situation data, and collecting and analyzing the visit history data of the location. Another object of the present invention is to provide an apparatus and method for extracting a trend of the preference, the pattern of location visits, etc., of a group of moving objects by collecting the location visit history data and extracted characteristics of the group of moving objects from many moving objects and analyzing them. Another object of the present invention is to provide a means for utilizing the extracted characteristic of the moving object.

In order to attain the above-described objects, the system of the present invention is comprised of a visit data acquisition unit for acquiring both the location data which a moving object has visited and the situation data at the time the moving object visited the location, a map information database in which a variety of attribute information of locations are stored, a visit history database in which both the location data and the visit situation data are related and stored, a characteristic extraction unit for extracting the characteristic of the moving object by extracting data from the visit history database and for analyzing the data and an extracted characteristic utilization unit for utilizing the extracted characteristic of the moving object.

According to the above-described configuration, the characteristic of a specific moving object can be extracted. Furthermore, the characteristic of the group of moving objects can be extracted by constructing a visit history database in which the moving object attribute data and the visit data of many moving objects are related and stored, and collecting and analyzing both the visit history data and the extracted characteristics, in order to extract the trend of the preference, the pattern of location visits, etc. relating to a group of moving objects.

The operations of the system of the present invention are as follows. When the location data of a visited location are acquired by utilizing the measured position information of a moving object, the situation data at the time the location was visited are acquired, the location data and situation data are related when visit data acquisition conditions are met, and visit data are acquired by the visit data acquisition unit of the above-described configuration of the present invention. The visit data are stored in the visit history database, and the characteristic of a moving object can be extracted from the visit data which are stored in the visit history database by the characteristic extraction unit. Finally, the extracted characteristic of the moving object can be utilized by the extracted characteristic utilization unit.

A program for the above-described operation of each process unit which is executed by a computer can be stored in an appropriate computer-readable storage medium, such as a portable medium memory, a semiconductor memory, a hard disk, etc.

BRIEF DESCRIPTION OF THE DRAWINGS

FIG. 10 shows the second example structure of a visit history database.

FIG. 12 shows an example configuration of an extracted characteristic utilization unit.

FIG. 17 shows a concrete example of location data.

FIG. 18 shows a concrete example of visit data.

FIG. 19 shows an example of data about locations and the frequency of visits in order to explain a concrete example of characteristic extraction rules.

FIG. 20 shows an example of situation data at a location Pos2 in order to explain a concrete example of characteristic extraction rules.

FIG. 21 shows an example of situation data at an eating place in order to explain a concrete example of characteristic extraction rules.

FIG. 22 shows an example of the number of moving objects and data about their attributes in a visited location in order to explain a concrete example of characteristic extraction rules.

DESCRIPTION OF THE PREFERRED EMBODIMENT

Figure 1:
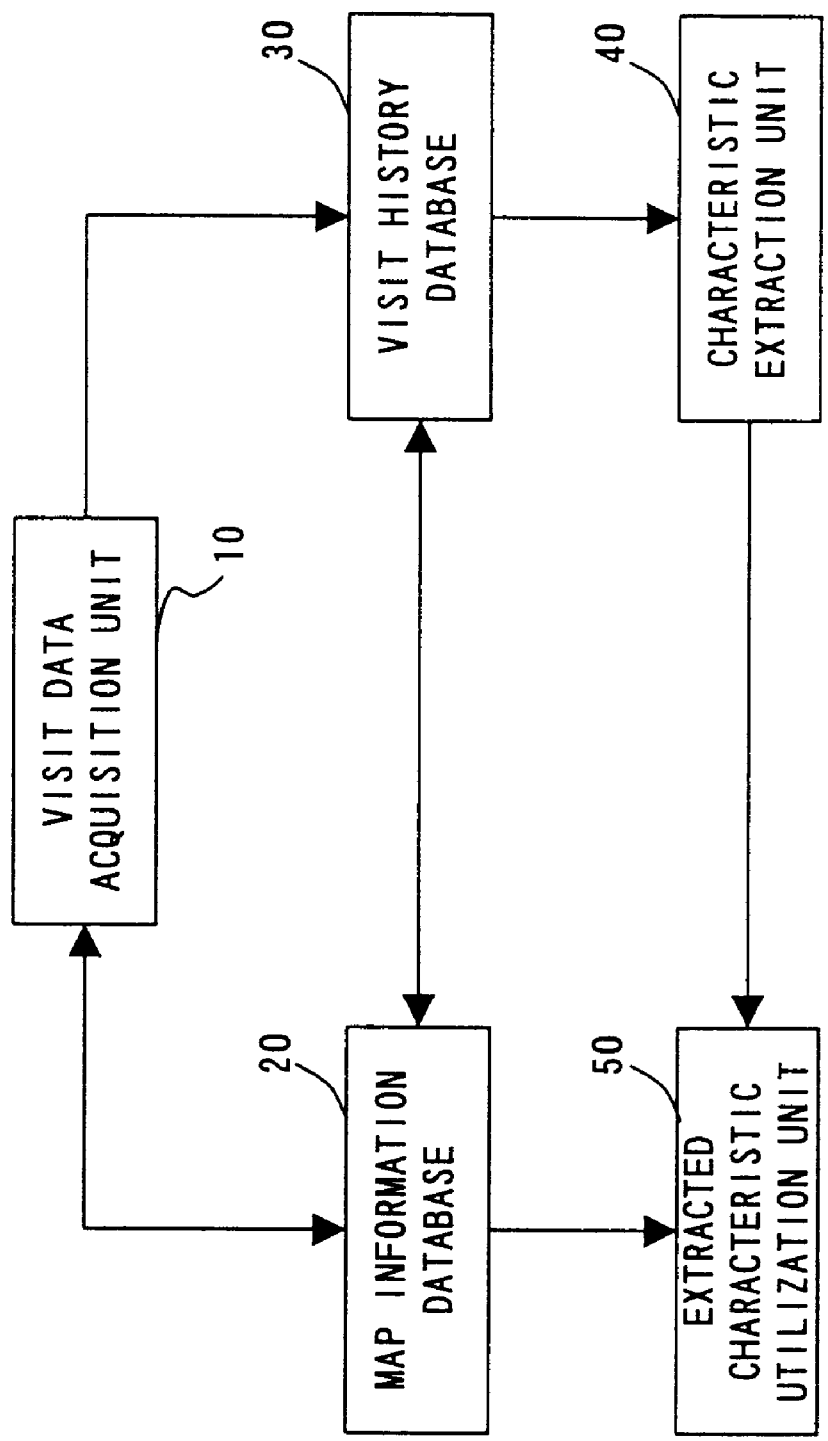
FIG. 1 shows a configuration of the present invention.

FIG. 1 shows a configuration of the present invention. First, a configuration example of the present invention is described with reference to FIG. 1, and then, its concrete preferred embodiment is described. A moving object can include a human being, vehicle, such as a car, boat, etc., animal, and artificial articles, such as products, commodities, etc. As shown in FIG. 1, a characteristic extraction apparatus for moving objects is comprised of a visit data acquisition unit 10, a map information database 20, a visit history database 30, a characteristic extraction unit 40 and an extracted characteristic utilization unit 50. Each of these units has the following configuration.

A) Visit Data Acquisition Unit 10

Figure 2:
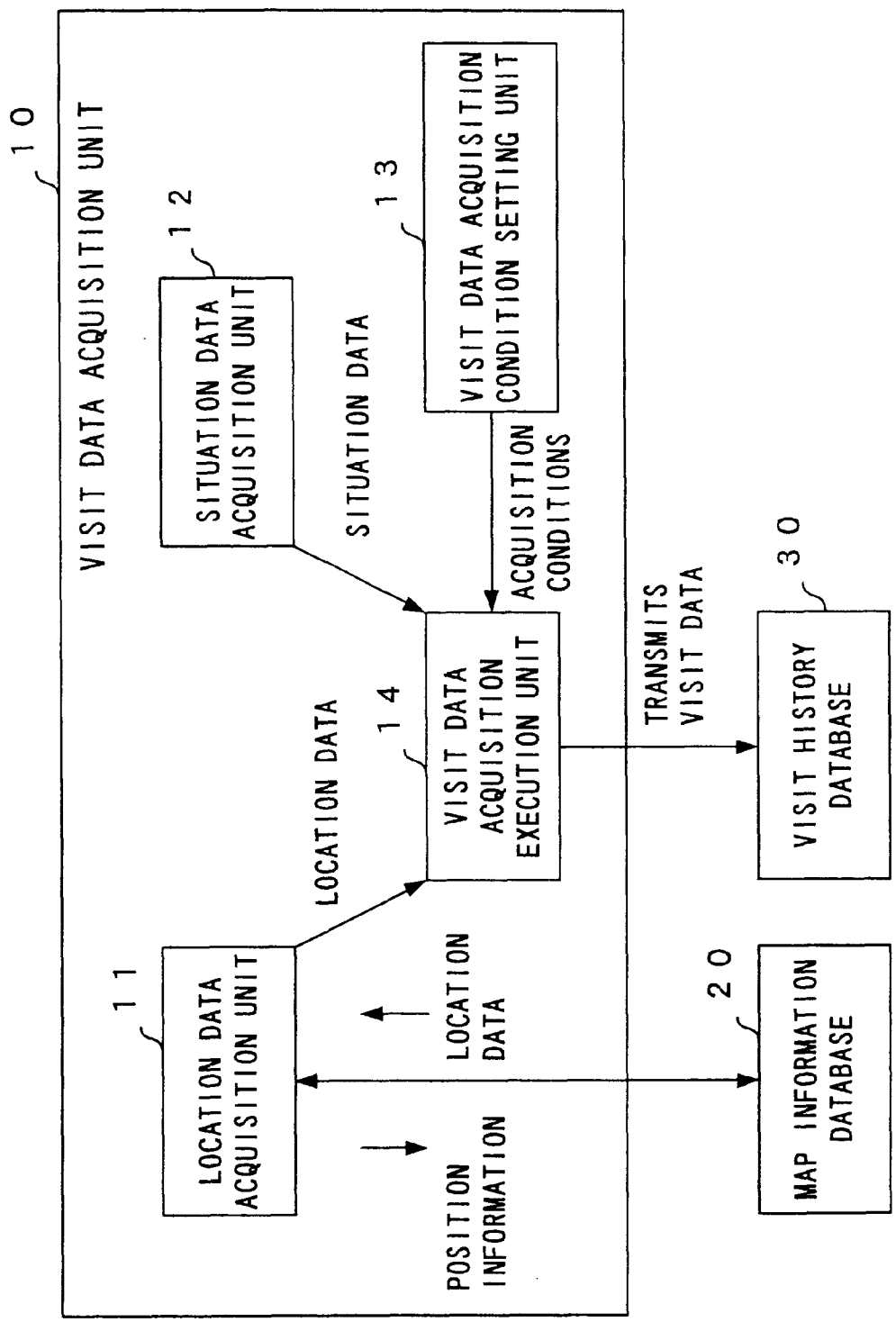
FIG. 2 shows an example configuration of a visit data acquisition unit.
Figure 3:
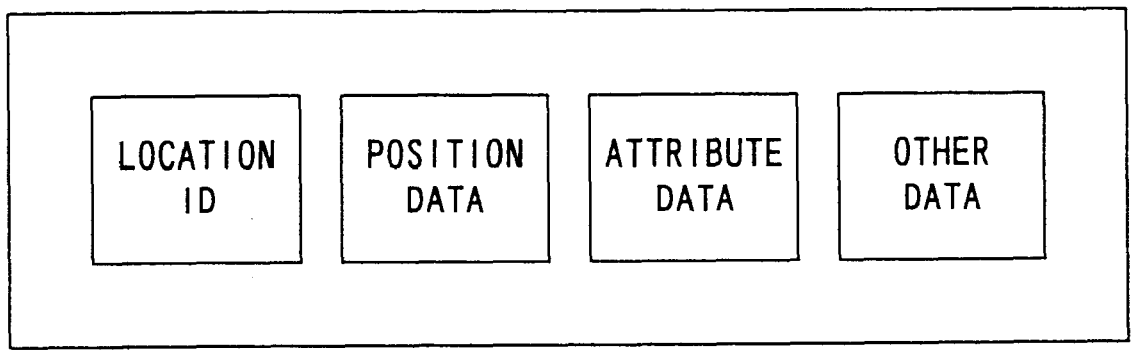
FIG. 3 shows an example structure of the contents of location data.
Figure 4:
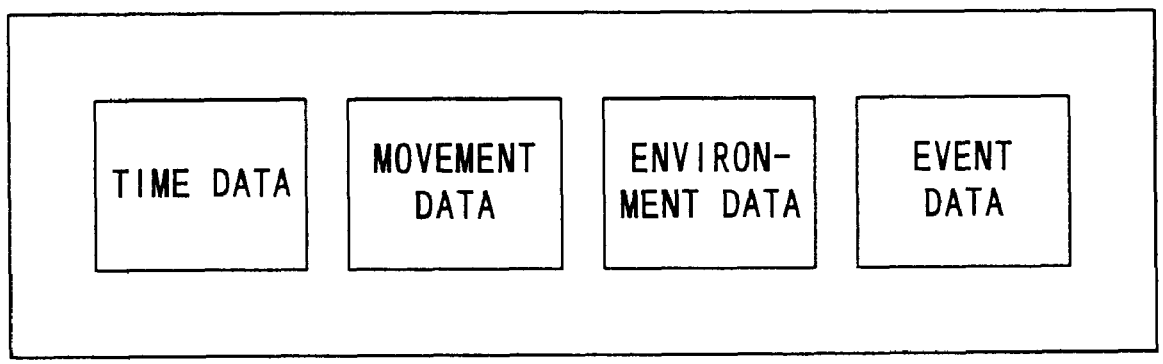
FIG. 4 shows an example structure of the contents of situation data.
Figure 5:
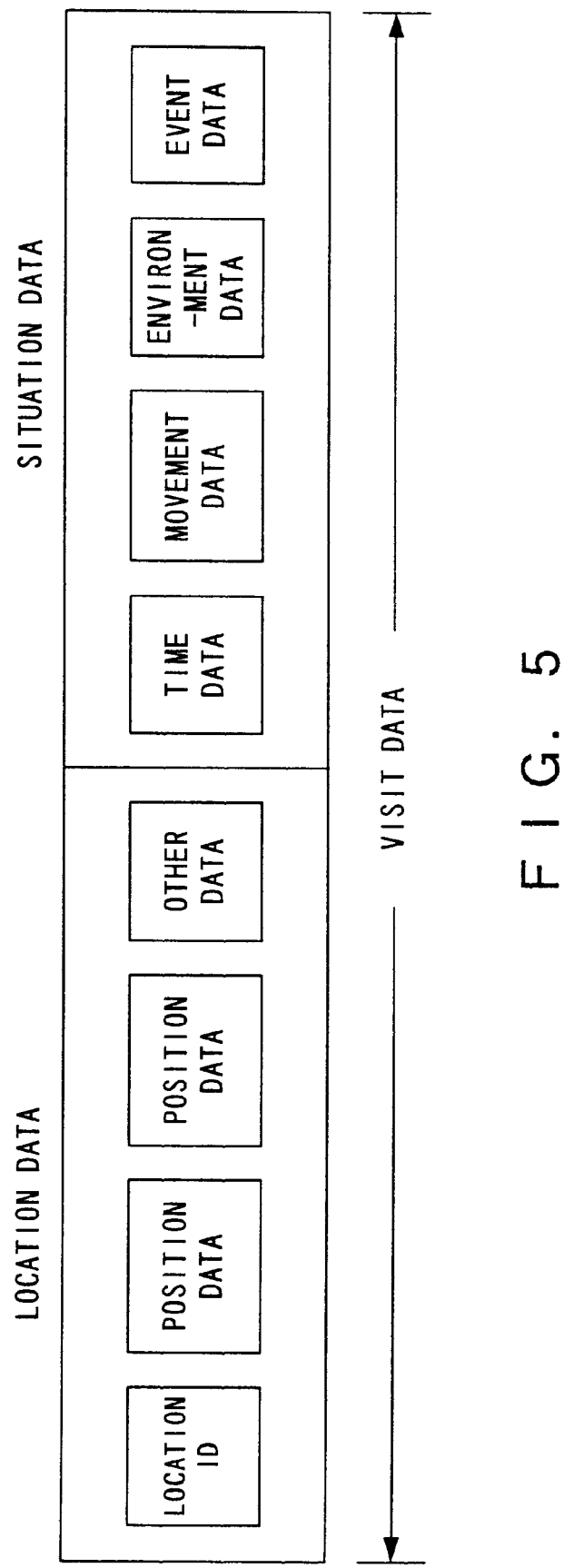
FIG. 5 shows the first example structure of the contents of visit data.
Figure 6:
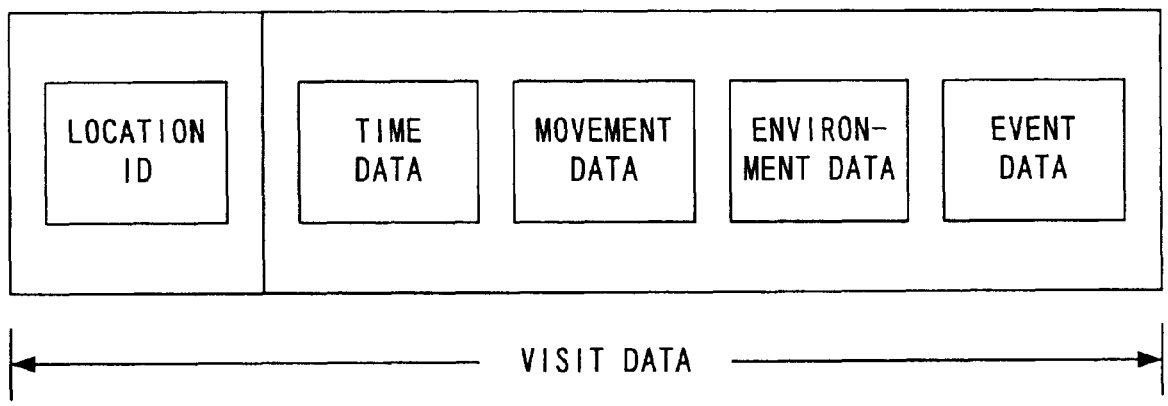
FIG. 6 shows the second example structure of the contents of visit data.

FIG. 2 shows a configuration example of a visit data acquisition unit 10. FIG. 3 shows an example structure of the contents of location data which the visit data acquisition unit 10 acquires. FIG. 4 shows an example structure of the contents of situation data which the visit data acquisition unit 10 acquires. FIGS. 5 and 6 show structure examples of the contents of visit data which the visit data acquisition unit 10 outputs.

As shown in FIG. 2, the visit data acquisition unit 10 is comprised of a location data acquisition unit 11, a situation data acquisition unit 12, a visit data acquisition condition setting unit 13 and a visit data acquisition execution unit 14.

The location data acquisition unit 11 measures the current position information of a moving object utilizing the measurement technology of the current position, such as a GPS which has been described as a related art, etc., and acquires the location data of the current location of the moving object utilizing a map information database 20 based on the position information.

The location data are data on locations, and as shown in FIG. 3, they include a location ID, position data, attribute data and other data. More information about location data is given later in the description of the map information database 20. Location data which are acquired by the location data acquisition unit 11 are transmitted to the visit data acquisition execution unit 14

The situation data acquisition unit 12 acquires data on a moving situation, such as a moving object itself, environment, etc. As shown in FIG. 4, the situation data include time data, movement data, environment data, event data, etc.

The time data are data on time. For example, the data include one or a combination of date, current time, start time of a visit, end time of a visit, a variety of elapsed times, a schedule, etc. The time data are calculated according to time information which is read by a timer built in the computer of this apparatus, etc.

The movement data are data on movement activities. For example, the data include one or a combination of a departure position, time of departure, passing route, a variety of elapsed times, speed, acceleration, existence/non-existence of companion, etc. When a car navigation system is used, the data also include a destination and locations passed through which are set in the system in advance.

The environment data are data on the environment of a location. For example, the data include one or a combination of weather, temperature, humidity, brightness, sound, smell, atmospheric pressure, etc. The environment data are created based on data which are read from a variety of sensors connected to the computer of this apparatus.

The event data are data on whether one of the events which are set in advance occurs. An event includes the following items, each of which can be set independently or combined with other events.

Examples of Kind of Events

1) An event indicating that an operation, which is designated in an apparatus, such as a car, information equipment, etc., is performed.

2) An event indicating that the moving speed or acceleration meets a criterion.

3) An event indicating that a designated activity, such as the use of money, etc., is performed.

4) An event indicating that a user designates the acquisition of visit data.

In this preferred embodiment, when visit data acquisition conditions are met, it is judged that a moving object has visited a location. The visit data acquisition condition setting unit 13 sets conditions specifying whether to acquire visit data. The visit data acquisition conditions include, for example, the following items.

Examples of Visit Data Acquisition Conditions

1) A condition that data are acquired at set time intervals (for example, every second, every three hours, etc.).

2) A condition that data are acquired at a set time (for example, at noon, at midnight, etc.).

3) A condition that data are acquired if a moving object stays in the same place for a set time period or more (for example, half an hour or more, etc.)

4) A condition that data are acquired if an event which is set in advance occurs (for information about the kind of event, see the above-described).

In addition to the information above, a variety of visit data acquisition conditions can be set.

The criteria determining whether a moving object stays in the same place in 3) above of the visit data acquisition conditions are as follows, each of which can stand independently or combined with the other conditions.

Examples of Staying Criteria

1) A moving object does not go out of the designated range of a location.

2) The moving distance after a certain time of a moving object is less than a designated value.

The visit data acquisition execution unit 14 obtains a variety of information from both the location data acquisition unit 11 and the situation data acquisition unit 12, and checks whether conditions which are set by the visit data acquisition condition setting unit are met. If the conditions are met, the visit data acquisition execution unit 14 acquires visit data based on both the location data and the situation data, and transmits the acquired visit data to a visit history database 30.

The visit data are created by relating the location data to the situation data. FIGS. 5 and 6 show example structures of the contents of visit data. In the example shown in FIG. 5, the location data and the situation data are incorporated into visit data. In the example shown in FIG. 6, the location ID of the location data and the situation data are incorporated into visit data. Since the location ID can specify location data which are stored in the map information database 20, the location ID can relate the situation data to the location data. When the examples of structures of visit data shown in FIGS. 5 and 6 are compared, the structure shown in FIG. 6 is more efficient since there is no need to store location data twice.

This apparatus also has a function to restrict the data contents of both location data to be acquired and situation data depending on the kind of visit data acquisition conditions.

B) Map Information Database 20

Figure 7:
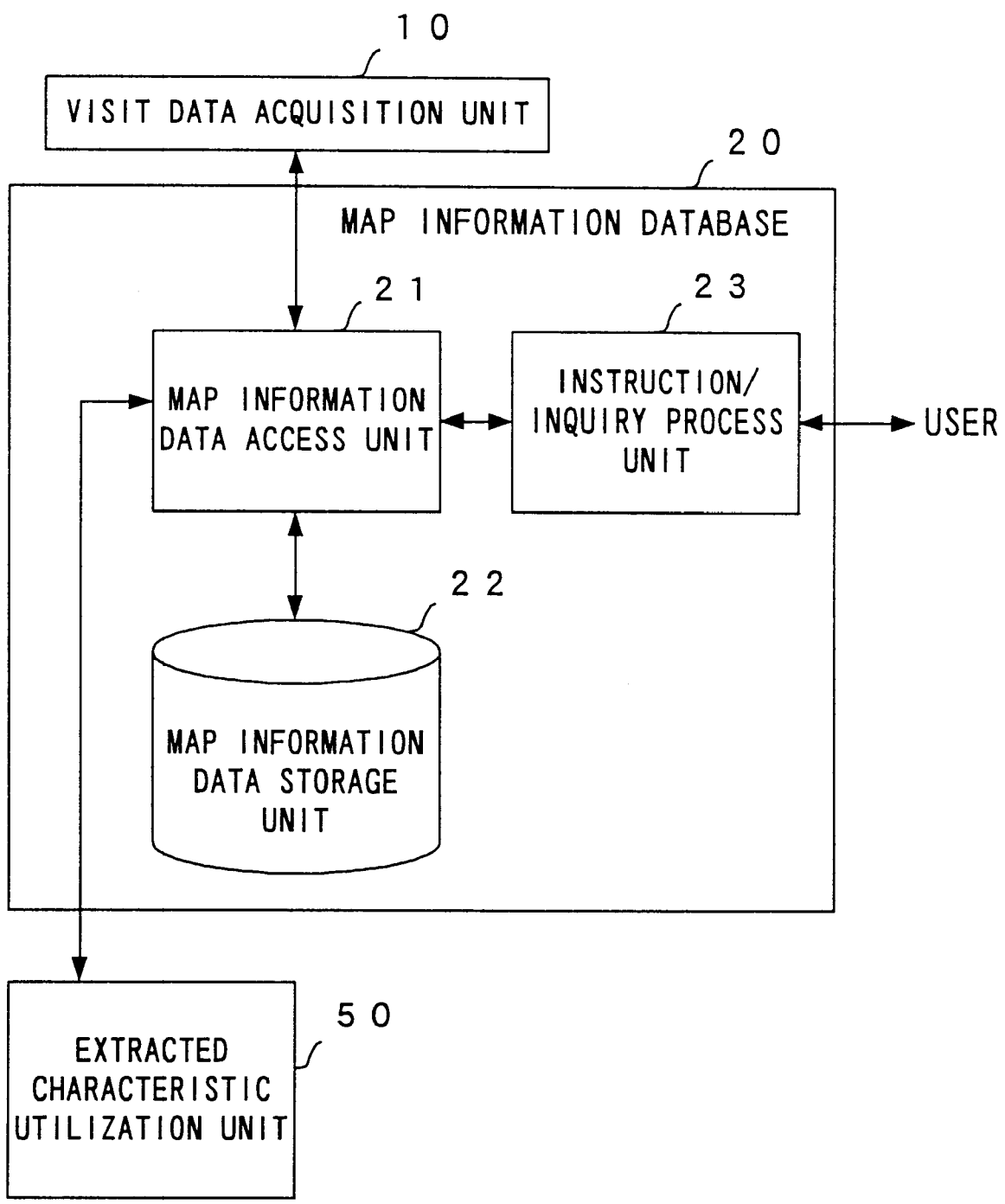
FIG. 7 shows an example structure of a map information database.
Figure 8:
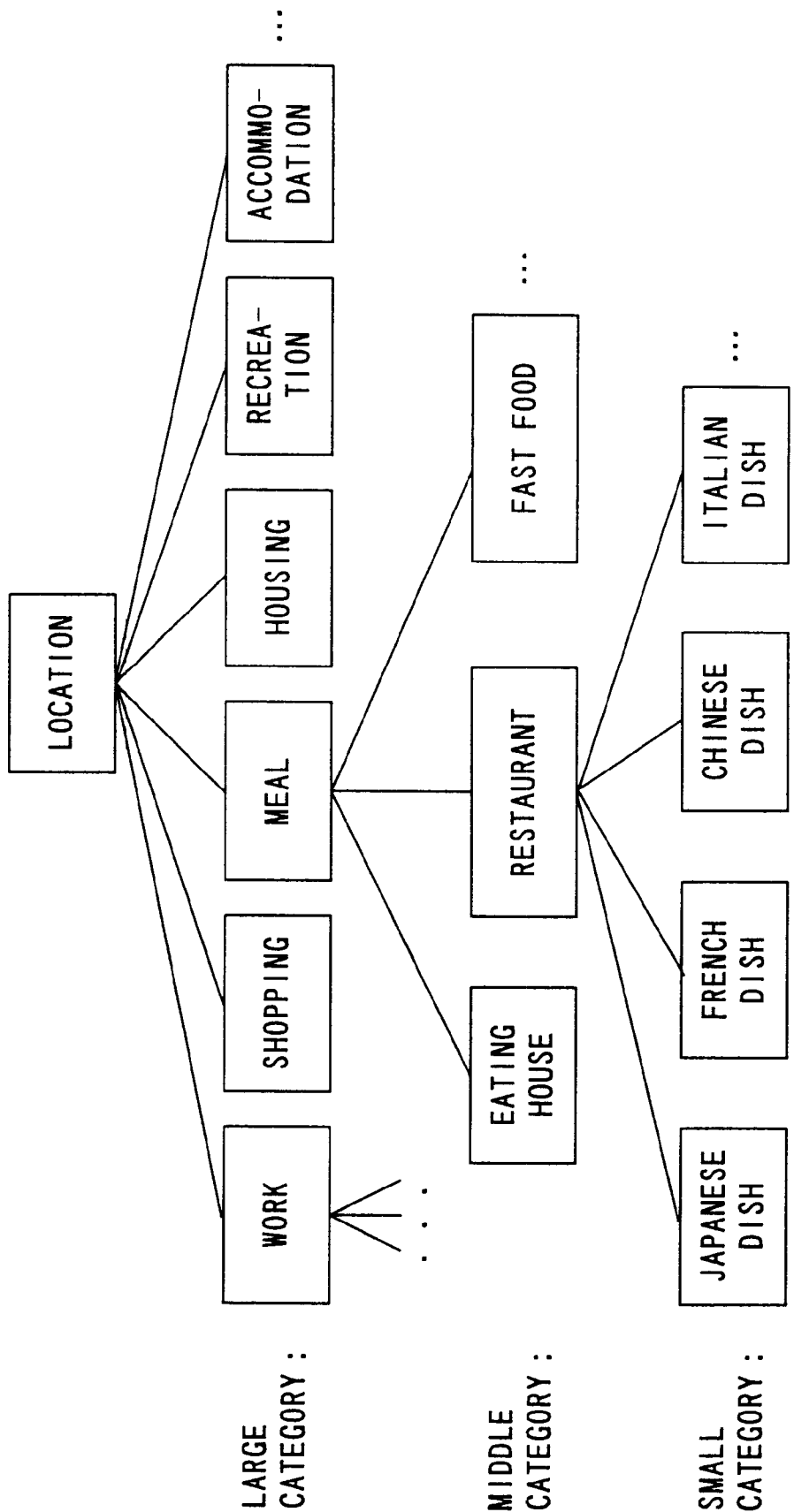
FIG. 8 shows an example hierarchical category classification in location data.

FIG. 7 shows an example structure of a map information database 20. FIG. 8 shows an example of hierarchical category classification in location data.

As shown in FIG. 7, the map information database 20 is comprised of a map information data access unit 21, a map information data storage unit 22 and an instruction/inquiry process unit 23. In the map information data storage unit 22, location data within a certain area or a certain building are stored. As shown in FIG. 3, the location data include the following items, in which a variety of data about location are stored.

The location data include, for example, the following items.
1) Location ID: An identification (ID) number for specifying a location
2) Position data: A position coordinate, a location area, a zip code, an address, etc.
3) Attribute data: Description of a location, hierarchical category classification, etc.
4) Other data: An image, a phone number, an owner, a route to a location, a characteristic, others (business hour, a regular holiday, number of seats, popularity, etc.)

The location data include one or a combination of the above-described items.

Here, a location area in 2) above means a range which is occupied by one location.

Hierarchical category classification in 3) above is a system of classification in which locations are grouped into hierarchical categories, and indicates the meaning the location has, what can be done in the location, etc. Specifically, and as shown in an example of hierarchical category classification in FIG. 8, each piece of location data is classified into work, shopping, meal, . . . , and meal, for example, is further hierarchically subdivided into an eating house, restaurant, fast food, . . . . The hierarchical category classification of attribute data indicates to which classification a location belong. The meaning of a location, what can be done in the location, etc., are known by obtaining information of a category classification.

The map information data access unit 21 of the map information database 20 has a retrieval function, and can retrieve location data using a variety of the above-described items as retrieval keys. It also has an output function, and can read and output the retrieved location data. It also has an edit function, and can register or erase location data, and modifies the contents of existing data. It also has an interface function in order to execute the above-described jobs. Moreover, it also has an automatic location data creation function, and can automatically create new location data if there is no location data corresponding to a position coordinate when location data are retrieved based on the position coordinate of a moving object.

The instruction/inquiry process unit 23 has an instruction/inquiry function, and can instruct a user to input data or can execute a process that queries a user of an empty item when there is an item of which the contents are empty of items with location data. An example of the instruction/inquiry function is shown below.

For example, since generally speaking the location of a user's home is not stored in the map information data storage unit 22 of an initial map information database 20, the instruction/inquiry function of the instruction/inquiry process unit 23 requests the user to register the empty item of location data which has the home position attribute of the user (here, a position coordinate, etc.). Since a location which is frequently visited and for which the location data are not stored in the map information database 20 is considered to be indispensable, the instruction/inquiry function queries the user as to the meaning of the location.

The map information database 20 receives a position coordinate from the location data acquisition unit 11 of the visit data acquisition unit 10, extracts location data on the location based on the position coordinate, and transmits the location data to the location data acquisition unit 11.

C) Visit History Database 30

Figure 9:
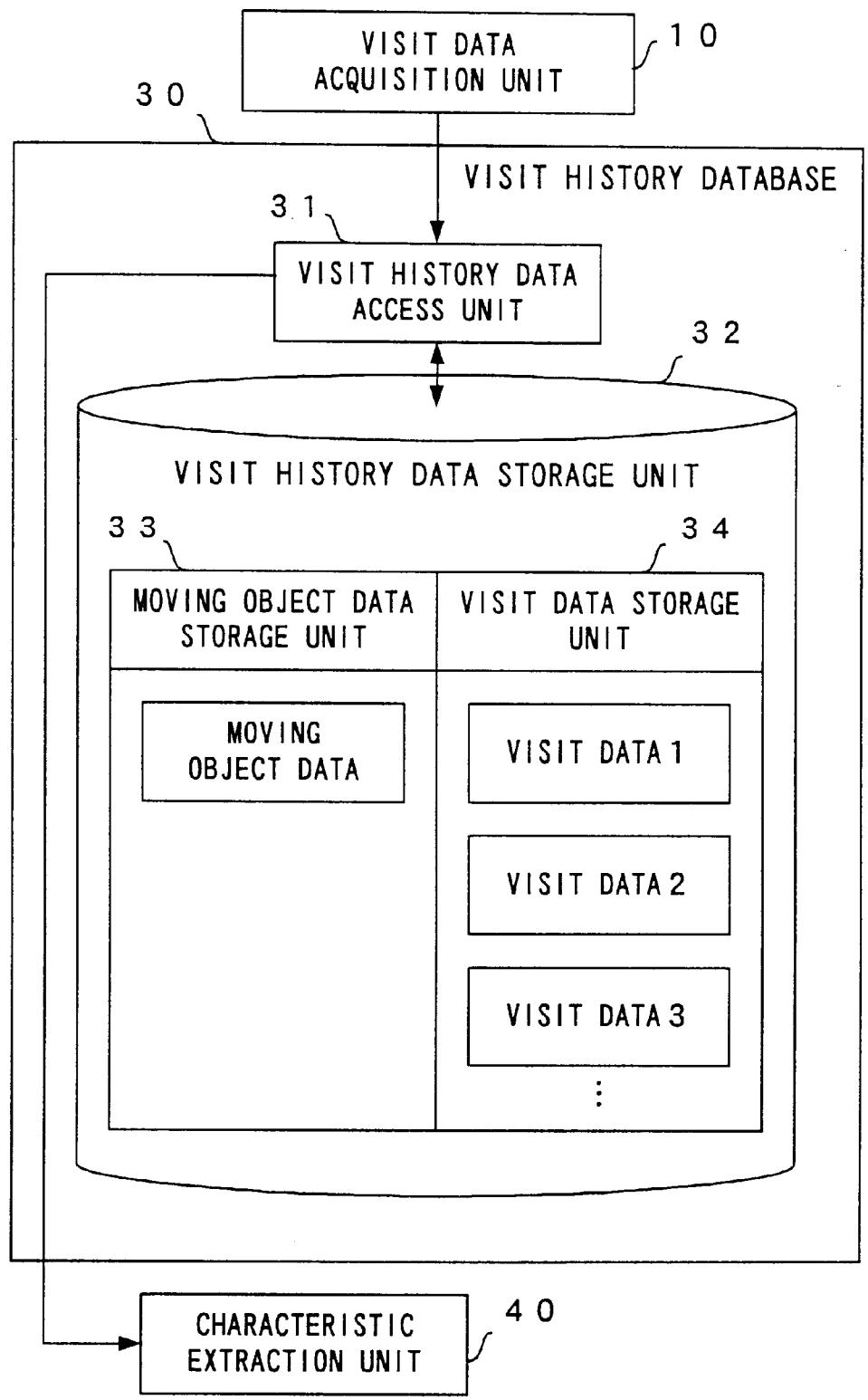
FIG. 9 shows the first example structure of a visit history database.

A visit history database 30 stores the visit history of a moving object. As shown in FIGS. 9 and 10, the visit history database 30 is comprised of a visit history data access unit 31, a visit history data storage unit 32, etc. The visit history data storage unit 32 includes a moving object data storage unit 33 and a visit data storage unit 34. If this apparatus corresponds to a plurality of moving objects, the visit history data storage unit 32 further includes a relation holding unit 35 for holding the relation between moving object data and visit data.

The moving object data storage unit 33 stores moving object data about the attributes of a moving object. For example, if a moving object is a human being, the items of a moving object include a name, sex, date of birth, age, blood type, family members, occupation, address, height, weight, figure, character, hobbies, preferences, driving history, accident history, etc. If a moving object is an artificial article, such as a product, a commodity, etc., the items of a moving object include description, functions, date of manufacture, type of product, weight, size, price, etc.

FIG. 9 shows an example structure of a visit history database 30 which is used when the visit history of one specific moving object or a group of moving objects of which the focused attribute is the same. In this case, only the moving object attribute data of one target moving object is stored. The visit data storage unit 34 stores visit data as the moving object moves and visits a variety of locations.

FIG. 10 shows an example structure of a visit history database 30 which corresponds to a plurality of moving objects. If there are a plurality of moving objects, attribute data are stored for each moving object. The visit history data storage unit 32 includes a relation holding unit 35, and can hold the relation between visit data and moving object data using a pointer, etc. In this way, the moving object to which each piece of visit data belongs can be known. However, even if the visit history database 30 for one moving object shown in FIG. 9 is used, the visit history of a plurality of moving objects can be held by preparing visit data history databases 30 for a plurality of moving objects and relating them to the moving objects.

D) Characteristic Extraction Unit 40

Figure 11:
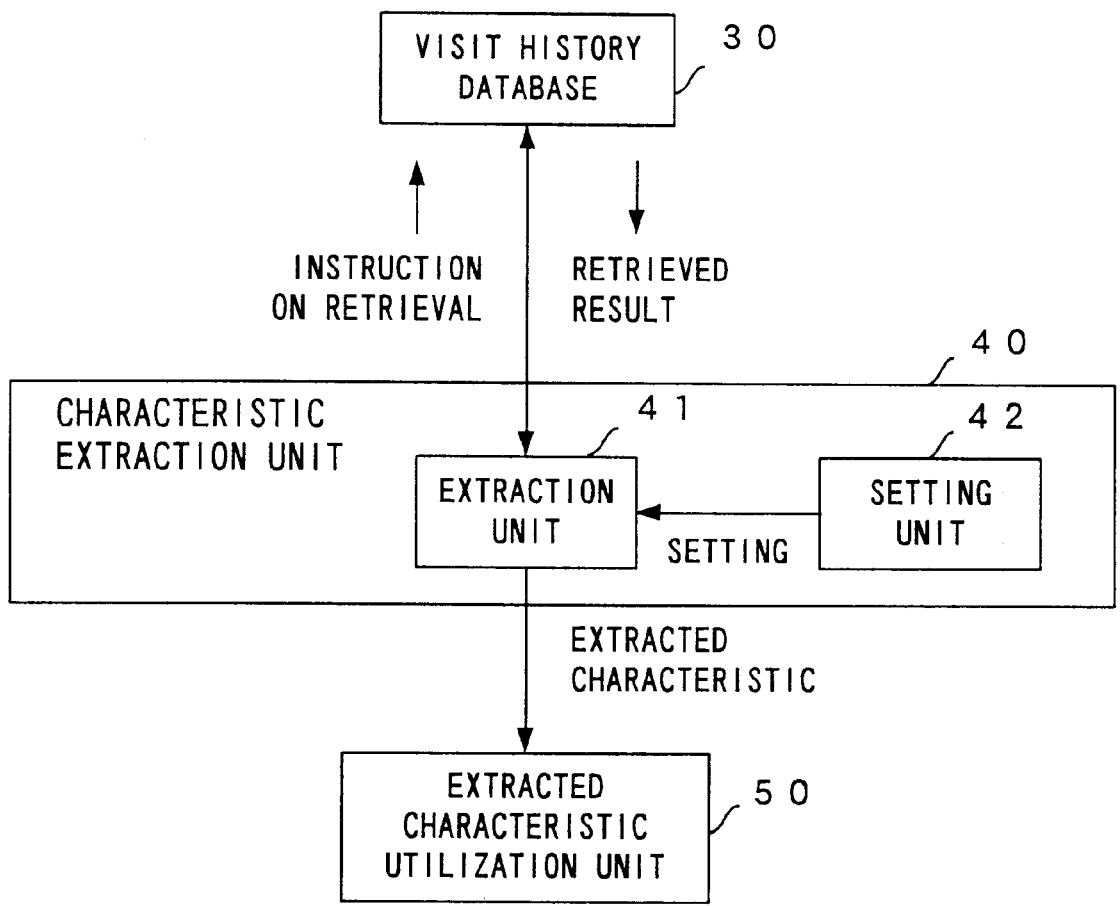
FIG. 11 shows an example configuration of a characteristic extraction unit.

FIG. 11 shows an example configuration of a characteristic extraction unit 40. The characteristic extraction unit 40 extracts the characteristics of a moving object based on both visit data and moving object data which are stored in the visit history database 30. As shown in FIG. 11, the characteristic extraction unit 40 is comprised of an extraction unit 41 for extracting the characteristic of a moving object and a setting unit 42 for setting the extraction unit 41.

The extraction unit 41 has two functions for characteristic extraction rules and data analysis. With the characteristic extraction rules, rules for extracting characteristics are set in advance. The data analysis includes the analysis of the relation between a visited location and the frequency of visits, the analysis of the relation between a visited location and a visit situation, the analysis of the relation between a visited location and a moving object attribute, the analysis of the relation between a visit situation and a moving object attribute, etc.

A concrete example of the characteristic of a moving object which is extracted in the extraction unit 41 is described below. For example, the frequency of visits of a visited location can be obtained by data analysis which counts the number of pieces of visit history data for each visited location, a frequently visited location can be extracted as a characteristic of a moving object by the characteristic extraction rules in which the frequently visited location is determined based on the frequency of visits.

An attribute of a location that is frequently visited can be obtained by analyzing the relation between the attribute of a visited location and the frequency of visits, and the characteristic of a moving object, such as preference, etc., can be extracted by the characteristic extraction rules by which the preference, etc., of the moving object are extracted from the attributes of locations.

The situation where a location is visited can be obtained by analyzing the relation between the visited location and visit situation of a moving object, and a visit situation of in what situation the moving object visits a location can be extracted as a characteristic of the moving object by the characteristic extraction rules by which the visit situation is determined.

The attributes of a moving object which visits a location, the correlation between a location and a moving object attribute, etc., can be extracted by analyzing the relation between the visited location and the moving object attribute, and the characteristic of the relation between a moving object attribute and a visited location can be extracted by the characteristic extraction rules which are specified for both the visited location and the moving object attribute.

Moreover, a moving object visits a location in a situation can be comprehensively analyzed by analyzing the visited location, the visit situation and the moving object attribute, and the characteristic of a moving object can be extracted by the characteristic extraction rules.

The characteristic extraction unit 40 can have either or both of the two extraction methods: automatic characteristic extraction and manual characteristic extraction. In the automatic characteristic extraction, the visit history database 30 is checked according to characteristic extraction conditions set in advance by the setting unit 42 and a characteristic is automatically extracted. In the manual characteristic extraction, both an extracting means and an item to be focused is designated by the user, and current data in the visit history database 30 are checked using the designated extracting means. In this case, the user can obtain a variety of characteristics by attempting a variety of extracting means.

The characteristic extraction unit 40 can extract the individual characteristic of one specific target moving object or can extract the group characteristic of a plurality of target moving objects.

The setting unit 42 performs the setting of the extraction unit 41, such settings includes the setting of characteristic extraction rules, the selection of a data analysis method, the selection of automatic characteristic extraction or manual characteristic extraction, the selection of whether to target one moving object or a group of moving objects, etc. These settings can be performed together with other settings as initial settings by utilizing a setting file which must be prepared in advance, or can be performed by a user through an appropriate input/output interface, as occasion demands.

The characteristic extraction rules, for example, can be realized by using a simple script with an IF-THEN format, and since an arbitrary expression method can be used, a detailed description of the expression method of the rules is omitted here. The rules can be described by using an existing program language. Alternatively, they can be set by selecting appropriate rules from many characteristic extraction rules, which are prepared in advance using a menu method.

E) Extracted Characteristic Utilization Unit 50

An extracted characteristic utilization unit 50 utilizes the characteristic of a moving object which is extracted by the characteristic extraction unit 40. FIG. 12 shows a configuration example of an extracted characteristic utilization unit 50. As shown in FIG. 12, the extracted characteristic utilization unit 50 is comprised of an extracted characteristic storage unit 51, extracted characteristic utilization rules 52, a utilization rule setting unit 53 and an output unit 54.

The extracted characteristic storage unit 51 stores the characteristics of a moving object, which were extracted by the characteristic extraction unit 40. The stored characteristics are utilized according to the extracted characteristic utilization rules 52, and are outputted by the output unit 54.

The extracted characteristic utilization rules 52 stores rules set in order to utilize the characteristics of a moving object, which were extracted by the characteristic extraction unit 40, and the characteristics of a moving object are utilized according to the stored rules. The utilization rule setting unit 53 performs a variety of settings of the extracted characteristic utilization rules 52. The output unit 54 outputs the result.

Below are concrete examples of the extracted characteristic utilization rules 52.

1) A rule of estimating and suggesting a certain location when a moving object is in a certain situation in the case where a characteristic of visiting the location if the moving object is in the situation is extracted.
2) A rule of suggesting a location when the location with a preference attribute of a moving object is located in the neighborhood in the case where attributes of a location which the moving object is to visit are analyzed and as a result, the preference attribute is extracted.
3) A rule of suggesting a characteristic of a moving object to a user when the characteristic is extracted, etc.

As with the characteristic extraction rules, extracted characteristic utilization rules 52, for example, can be expressed using a simple script with an IF-THEN format, an existing program language, etc. The rules can also be set using a menu method.

F) Flowcharts Showing the Processes in this Preferred Embodiment

Figure 13:
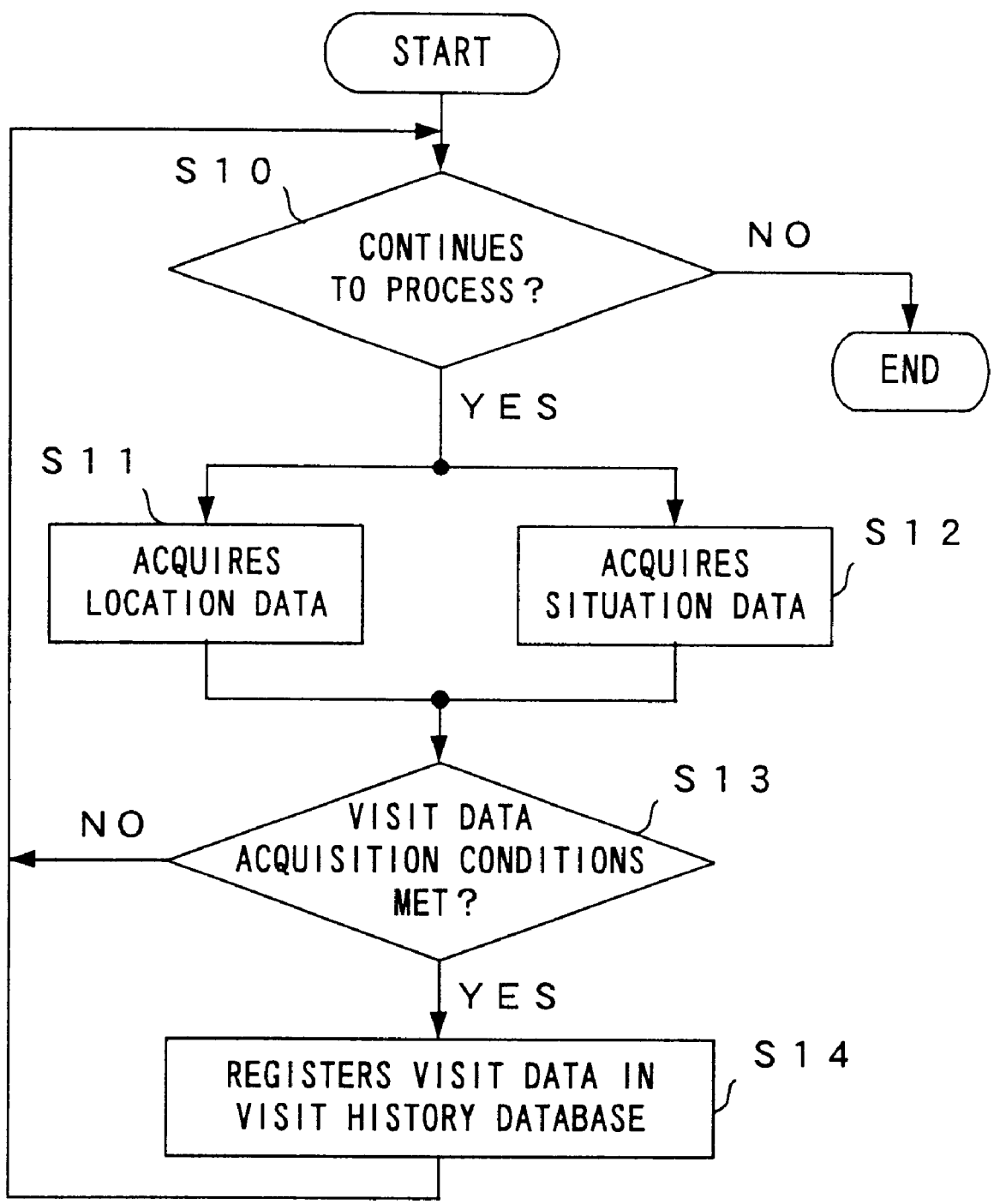
FIG. 13 is a flowchart showing the process of registering visit data in a visit history database.

FIG. 13 is a flowchart showing the process of registering visit data into which location data and situation data are incorporated in a visit history database 30 when visit data acquisition conditions are met. When starting the process, the visit data acquisition unit 10 repeats the following processes until it receives an instruction to terminate them (step S10). Location data are acquired by the location data acquisition unit 11 (step S11), and situation data are acquired by the situation data acquisition unit 12 (step S12). The visit data acquisition execution unit 14 judges whether both the data meet visit data acquisition conditions which are set by the visit data acquisition condition setting unit (step S13). If the data do not meet the conditions, the flow returns to step S10, and the process is repeated. If the data meet the conditions, visit data are created from both the location data and the situation data, and the data are registered in the visit history database 30 (step S14). The above-described processes are repeated until an instruction to terminate them is received.

Figure 14:
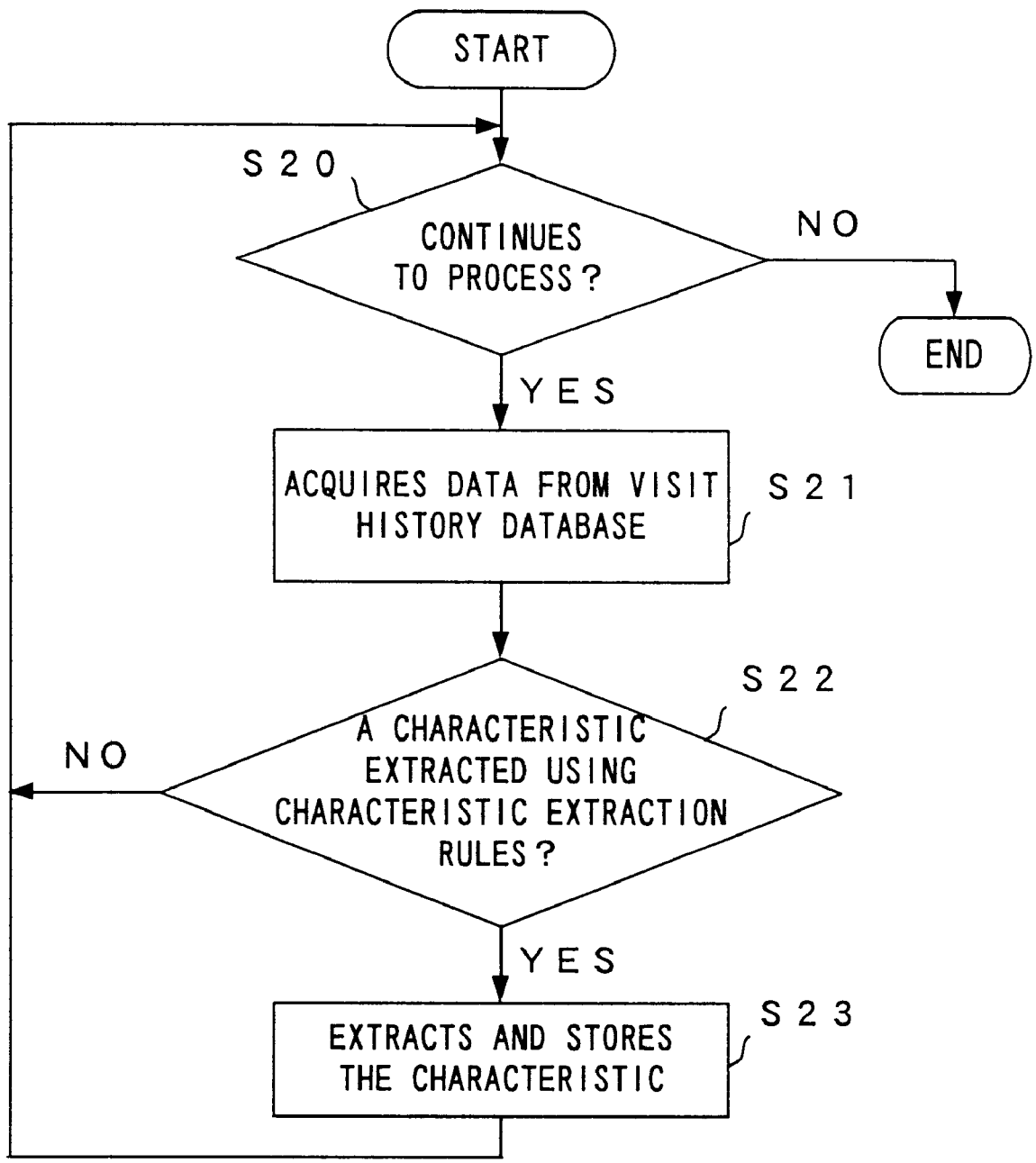
FIG. 14 is a flowchart showing the process of extracting the characteristic of a moving object in a characteristic extraction unit.

FIG. 14 is a flowchart showing the process of extracting the characteristic of a moving object in the characteristic extraction unit 40. When starting the process, the characteristic extraction unit 40 repeats the following processes until it receives an instruction to terminate them or it completes all the processes for visit history data to which the characteristic extraction rules are to be applied (step S20). First, the characteristic extraction unit 40 acquires data from the visit history database 30 (step S21). The extraction unit 41 applies the characteristic extraction rules which are set by the setting unit 42 to the data, and judges whether a characteristic is extracted (step S22). If a characteristic cannot be extracted, the flow returns to step S20, and the process is repeated. If a characteristic can be extracted, the characteristic is extracted and stored in a memory or an appropriate external storage medium, or the extraction result is directly transmitted to the extracted characteristic utilization unit 50 (step S23). The above-described processes are repeated.

Figure 15:
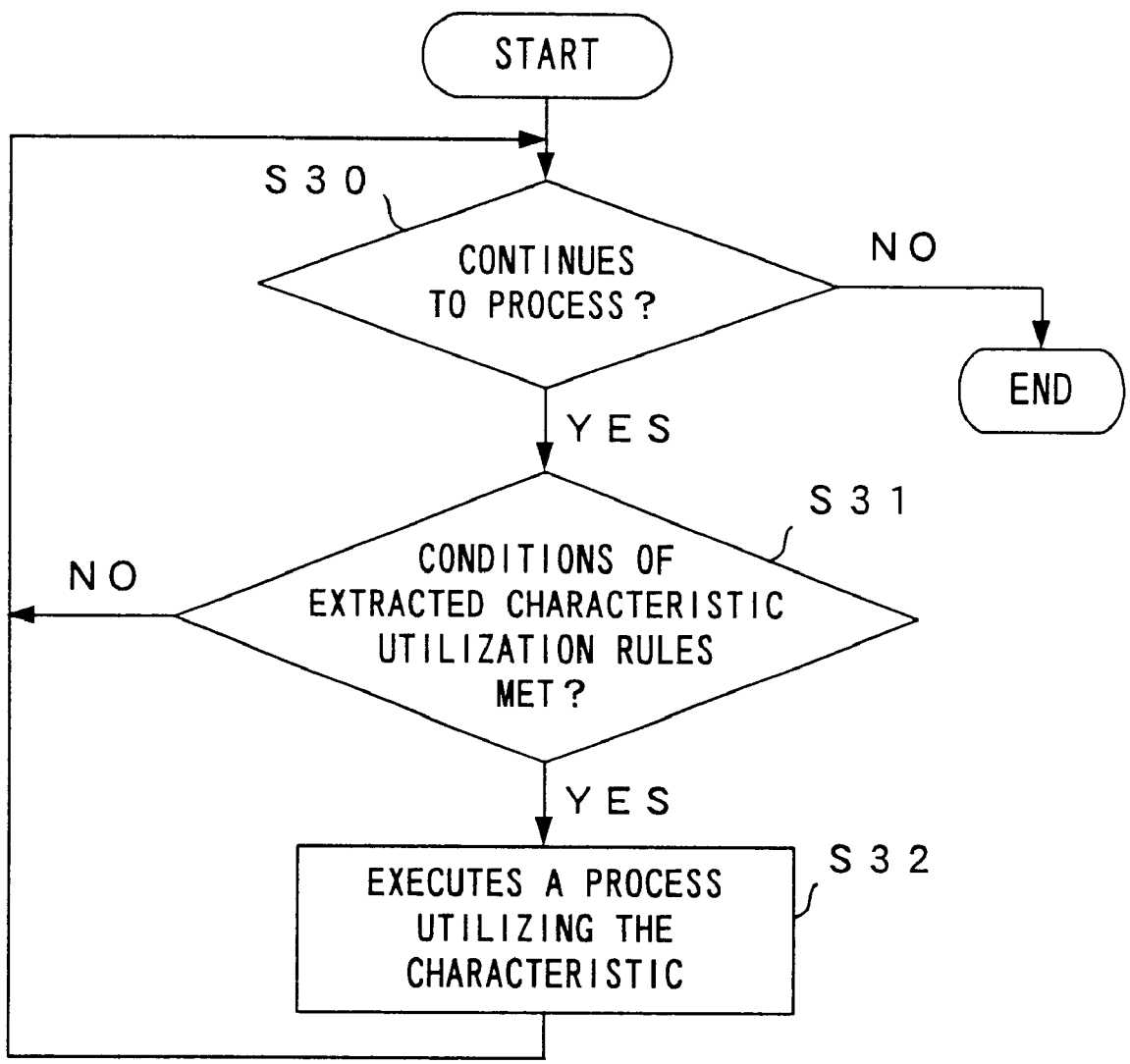
FIG. 15 is a flowchart showing the process of utilizing the characteristic of a moving object extracted in an extracted characteristic utilization unit.

FIG. 15 is a flowchart showing the process of utilizing the characteristic of a moving object which is extracted in the extracted characteristic utilization unit 50. When starting the process, the extracted characteristic utilization unit 50 repeats the following processes until it receives an instruction to terminate them or it completes all the processes for the extracted characteristic to which the extracted characteristic utilization rules 52 are to be applied (step S30). First, it is checked whether a characteristic which is stored in the extracted characteristic storage unit 51 meets the conditions of the extracted characteristic utilization rules 52 which are set by the utilization rule setting unit 53 (step S31). If the characteristic meets the conditions of the extracted characteristic utilization rules 52, a process of utilizing the characteristic of a moving object is executed according to the extracted characteristic utilization rules 52 (step S32). If required, the characteristic of the moving object is outputted to the input/output interface of a user or an appropriate external medium by the output unit 54. The above-described processes are repeated.

G) An example Hardware Configuration

Figure 16:
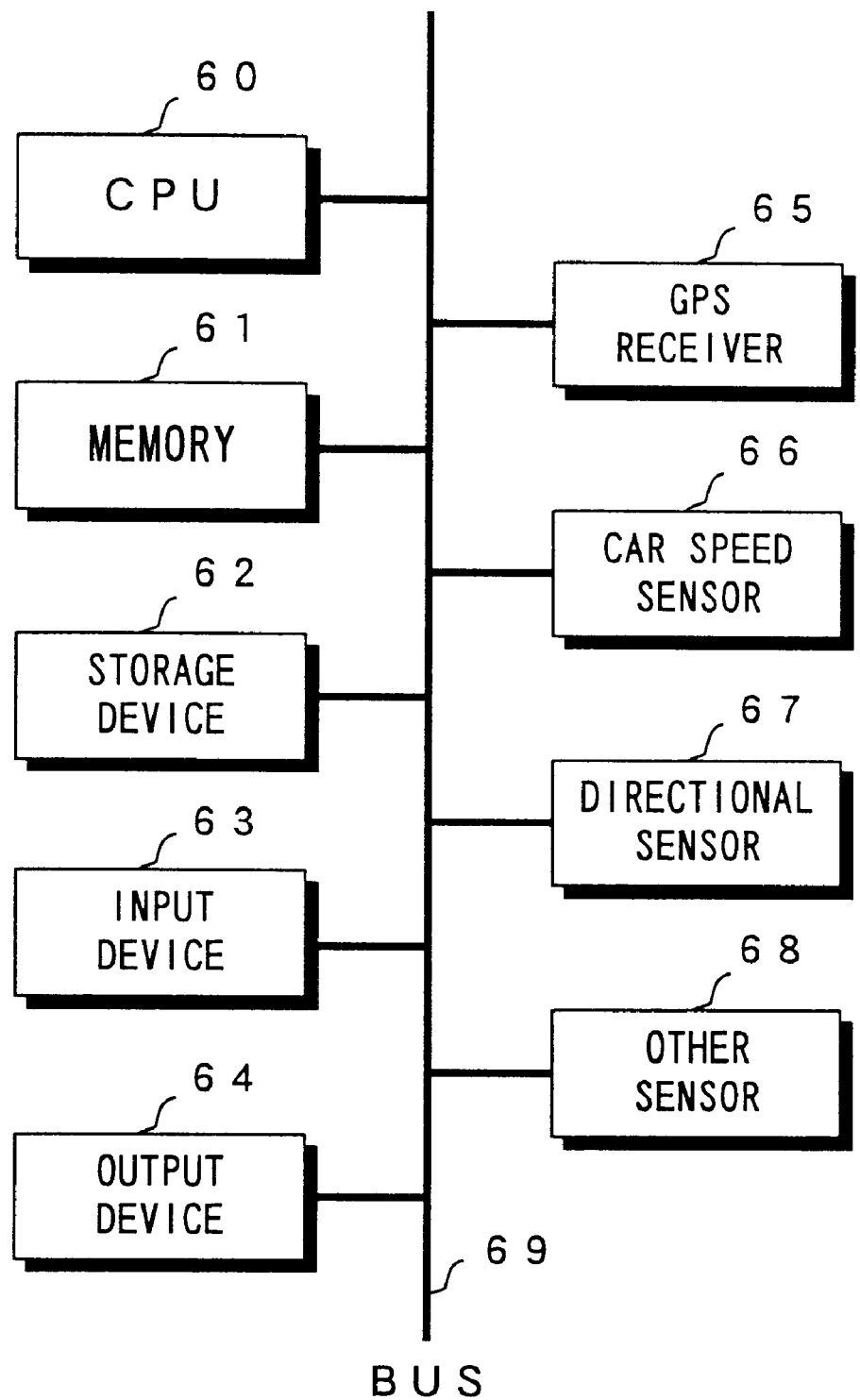
FIG. 16 shows a configuration example of the hardware of the characteristic extraction apparatus for moving objects.

FIG. 16 shows an example configuration of the hardware of a characteristic extraction apparatus for moving objects. The hardware configuration of this apparatus, for example, is as shown in FIG. 16. This apparatus comprises a CPU 60, a memory 61, a storage device 62, an input device 63, an output device 64, a GPS receiver 65, a car speed sensor 66, a directional sensor 67 and the other sensor 68, which are connected via a bus 69.

The GPS receiver 65, the car speed sensor 66, the directional sensor 67 and the other sensor 68 comprises both the location data acquisition unit 11 .and the situation data acquisition unit 12 of the visit data acquisition unit 10. The storage device 62 consists of auxiliary storage devices, such as a semiconductor memory, CD-ROM, DVD, etc., in which storage units for both the map information database 20 and visit history database 30 are constructed. The memory 61 stores programs to construct the location data acquisition unit 11, situation data acquisition unit 12, visit data acquisition condition setting unit 13, visit data acquisition execution unit 14, characteristic extraction unit 30, characteristic extraction unit 40, etc. These programs are executed by the CPU 60.

If this apparatus is used to collect visit data of one specific moving object and to extract the characteristic of the specific moving object, its hardware can be configured using the devices shown in FIG. 16 in such a way that the moving object can carry the devices. If this apparatus is used to collect visit history data from many moving objects and to extract the characteristic of the group of the moving objects, it can be configured in such a way that each moving object carries only the visit data acquisition unit 10 out of units shown in FIG. 1 and the remaining map information database 20, visit history database 30, characteristic extraction unit 40 and extracted characteristic utilization unit 50 are installed in a center, or in such a way that each moving object carries all the units shown in FIG. 1. If the characteristic extraction unit 40, etc. are installed in the center, the visit data of each moving object are transmitted to the visit history database 30 of the center through a communication network, etc., and the visit data of the many moving objects are collected by a computer system in the center.

H) Utilization Form

Concrete examples of the utilization of extracted characteristic are given below. This apparatus can be utilized in the following systems.

1) A system in which a location frequently visited by a moving object and its visit situation are obtained, a location corresponding to the situation is suggested and navigation of the moving object is aided.

2) A system in which a preference and an interest of a moving object is obtained, a favorite location or a preferred location to the moving object is recommended depending on the situation, and navigation of the moving object is aided.

3) A system in which visit history data are acquired from many people within a certain area, a movement trend, preference, etc., of the people in the area are extracted and utilized.

4) An automatic movement record (diary) creation system in which the current location of a specific moving object is recorded at a designated time, at designated time intervals or when a designated event occurs, and the recorded data can be displayed using a variety of methods.

I) A Concrete Example of Location data

FIG. 17 shows a concrete example of location data. In the concrete example shown in FIG. 17, location data are composed of a location ID, position data which consist of the east longitude and north latitude, and attribute data which consist of a large category and a small category, and other data are omitted.

J) A Concrete Example of Visit Data

FIG. 18 shows a concrete example of visit data. In the example shown in FIG. 18, the visit data of the seven locations in FIG. 17 which are assumed to have been visited are shown. The visit data are comprised of location IDs, time data which consist of the date of the visit, the day of week of the visit and the time of the visit, movement data which consist of a previous location and the time of departure from the previous location, and event data. In this example, the event data consist of the entering and exiting of a car, and a set time (midnight (0:00) and noon (12:00)), assuming a case where car-mounted information processing equipment is provided with this characteristic extraction apparatus.

The visit data acquisition conditions are set for these events and other values, and visit data are collected according to the conditions. The visit data shown in FIG. 18 are examples of visit data which are collected when the visit data acquisition conditions are met, and correspond to the structure example of the contents of the visit data shown in FIG. 6. The collected visit data are stored in the visit history database 30.

K) A Concrete Example of Characteristic Extraction Rules

Next, characteristic extraction rules and concrete examples are given.

K-1) "Extracts a location which is frequently visited."

If a location which a moving object frequently visits is extracted as one characteristic of the moving object, for example, the frequency of visits to each location is obtained by counting the number of pieces of visit history data for each location. Then a rule stating that a certain location is extracted as a location which is frequently visited if the frequency of visits to the location meets a designated criterion, is set.

FIG. 19 shows an applied example of this rule in which the frequency of visits is obtained by using the visit data shown in FIG. 18. According to this rule, three visits or more is set as a criterion for frequently visited locations, and three locations of Pos1, Pos2 and Pos5 are extracted as frequently visited locations according to the rule using the data shown in FIG. 18.

K-2) "Extracts the preference of a moving object from the attributes of a frequently visited location"

The attribute of a frequently visited location which a moving object frequently visits is obtained by analyzing the relation between the frequency of visits and the attribute of a location, and a characteristic, such as the preference of the moving object is extracted from the attributes of a location. For example, according to both locations and the frequency of visits shown in FIG. 19, which are obtained from the visit data shown in FIG. 18, it is found that this moving object has visited a Western restaurant, Japanese restaurant and Chinese restaurant, three times, once and once, respectively to have a meal. In this case, if, for example, in accordance with a rule it is determined that the moving object prefers the dish of a restaurant which has been most frequently visited by the moving object is set, a characteristic that the moving object prefers Western dishes can be extracted.

If it is assumed, for example, that the moving object has visited two locations (restaurants) with a different attribute of a Western dish (restaurants A and B) and has visited restaurants A and B twice and once, respectively, a characteristic that the moving object prefers restaurant A can be extracted.

Since the above-described example is based on the visit data shown in FIG. 18, the frequency of visits which is effective data in extracting the characteristic of the moving object is small. However, since actually the process is executed based on many pieces of visit data, and a criterion (for example, the frequency of visits becomes several times more) for judging that the moving object prefers one to the other is set, a target characteristic can be extracted if the criterion is met.

K-3) "Extracts the routine pattern of a moving object based on locations and visit situations"

The situation in which a moving object has visited a location is analyzed by analyzing the relation between a location and a visit situation, and a routine pattern of movement and visit is extracted as the characteristic of the moving object.

Concrete examples are given below based on the visit data shown in FIG. 18. If a location with a location ID of Pos2 is focused and its visit situations are listed, data about visit situations shown in FIG. 20 is obtained.

In this case, for example, the following rules can be set in order to extract the characteristic of the moving object.
a) Counts the frequency of the departures from a certain location for each visited location, and, if the frequency meets a certain criterion, extracts the set of the departed location and visited location.
b) Calculates the time interval and average times of departure for the set extracted in a) above.
c) Calculates the time interval and average times of arrival for the set extracted in a) above.
d) Finds the regularity of the visit day of the week for the set extracted in a) above.

If these four rules are applied to the data shown in FIG. 20, the routine pattern of the moving object, can be extracted as follows.

a) It is from a location Pos1 that the moving object visits a location Pos2.
b) The time of departure from Pos1 is between 7:10 and 7:20, and its average value is 7:15.
c) The time of arrival at Pos2 is between 8:00 and 8:15, and its average value is about 8:08.
d) The visit days of the week are Thursday, Friday and Monday. And a pattern that the moving object visits Pos2 on weekdays can be extracted if more data are obtained.

If out of the visit data shown in FIG. 18, for example, eating places are focused, data on a situation in which the moving object visits eating places shown in FIG. 21 can be obtained. In this case, for example, the following rules can be set.
a) Calculates how often each eating place is visited, extracts the percentage in which the food is eaten out according to a criterion set for the frequency.
b) Calculates the time interval, average time of visits to each eating place, etc.
c) Extracts the regularity of a series of eating places.

If the three above-described rules are applied to the data shown in FIG. 21, the following routine pattern can be extracted.
a) The frequency of the visits to the eating places of the moving object is extraordinarily high (in this case, everyday)
b) The time of a visit to the eating places is between 19:00 and 20:00, and its average value is 19:20
c) The moving object eats out at a Western restaurant every three days, etc.

K-4) "Keeps the regular trace record of movement"

The visited locations of a moving object are recorded regularly, the frequency of visits to locations for each recorded time is counted, and the locations are analyzed according to a criterion which is set for the frequency. For example, a rule for judging that a location where the moving object stays most frequently at midnight (0:00) is his or her home is assumed here. Since, according to the visit data shown in FIG. 18, the moving object stays in locations Pos1 and Pos7 at midnight four times and once, respectively, Pos1 can be guessed to be his or her home.

Although so far the characteristic of an individual moving object has been extracted, the characteristic of a group of moving objects is extracted in the following example.

K-5) "Extracts the characteristic of the relation between the attribute and visited location of a group of moving objects"

The number of moving objects that visit a certain location is counted. Alternatively, the number of moving objects that visit a location is counted for each attribute of the moving objects, and the ratio of the number of moving objects that visit the location for each attribute to the total number of the group of moving objects that visit the location is calculated. According to a criterion which is set for the calculated values, the popularity of locations can be compared or the attribute of the moving objects that have visited a location can be extracted.

In this case, for example, the following rules can be set as characteristic extraction rules.
a) Compares the number of visiting moving objects for each of a plurality of locations, and checks their popularity based on the number of visiting moving objects.
b) Calculates the ratio of a certain attribute for a location, and, if the ratio meets a predetermined criterion, extracts a characteristic that the attribute and the location are related.

FIG. 22 shows a concrete example of the number of moving objects that visit two locations, PosA and PosB, and the ratio of each of two attributes. If the above-described rules are applied to the data shown in FIG. 22, the following characteristics can be extracted.

a) Generally speaking, PosA is more popular than PosB.
b) Many females and minorities visits PosA.

Although not shown here, a characteristic specifying which moving object visits which location in which situation can also be extracted by comprehensively analyzing visited locations, visit situations and the attributes of moving objects.

L) A concrete Example of Extracted Characteristic Utilization Rules

In the earlier description of the extracted characteristic utilization unit 50, the following rules have been described as concrete examples of the extracted characteristic utilization rules 52. Rule R1) A rule of estimating and suggesting a certain location when a moving object is in a certain situation in the case where a characteristic that a moving object visits the location if the moving object is in the situation is extracted Rule R2) A rule of suggesting a location if the location with a preference attribute of a moving object is located in the neighborhood in the case where attributes of locations which the moving object is to visit are analyzed and as a result, the preference attribute is extracted Rule R3) A rule of suggesting a characteristic of a moving object to a user when the characteristics are extracted.

Here, concrete examples of the extracted characteristic utilization rules 52 is shown using the data shown in FIGS. 17 through 22.

As described earlier, by utilizing the above-described extracted characteristic utilization rule R1, a characteristic that a moving object moves from a location Pos1 to a location Pos2 at about 7:15 on a weekday can be extracted from a situation where the moving object visits the location Pos2 shown in FIG. 20. If a moving object is located at the location Pos1 at about 7:15 on a weekday, the location Pos2 can be estimated to be a destination, for example, by a car navigation device and Pos2 can be set for its destination in the car navigation device by utilizing this rule.

By utilizing the above-described extracted characteristic utilization rule R2, a characteristic that the moving object likes Western dishes and eats out at about 19:20 can be extracted as described in the example where the preference of the moving object can be extracted from the attribute of a frequently visited location or as described in the example where the routine pattern of the moving object can be extracted based on locations and visit situations in the description of the concrete example of the characteristic extraction rules. If the time is about 19:00, the position of a restaurant near the current location can be presented, for example, in a car navigation device by using this rule.

By utilizing the above-described extracted characteristic utilization rule R3, when a characteristic of the moving object can be extracted, the characteristic can be outputted to an appropriate output device, such as a display, a speaker, etc., depending on the situation at that time.

The extracted characteristic utilization rules are not limited to those described above, and a variety of utilization rules can be considered.

As described above, according to the present invention, the location data of visited locations can be acquired by the visit data acquisition unit by utilizing both the measured position information of a moving object and the map information database, the situation data of a situation of the visited location are acquired, and when the visit data acquisition conditions are met, the location data and the situation data are related, and visit data are obtained. The visit data are stored in the visit history database, and the characteristic of the moving object can be extracted from the visit data which are stored in the visit history database by the characteristic extraction unit. Finally, the extracted characteristic of the moving object can be utilized by the extracted characteristic utilization unit.

Accordingly, for example, a location which a moving object frequently visits and its visit situation are acquired, and if the situation is realized, a corresponding location can be presented. Alternatively, the preference of a moving object is acquired, and the favorite location of or interesting location for the moving object can be recommended to the moving object. Alternatively, visit history data are acquired from many people within a certain area, and the movement trend and the preference of the people within the area can be extracted and utilized. Alternatively, the current location of a specific moving object is recorded at a designated time, at designated time intervals or when a designated event occurs, and the recorded data can be displayed in various methods.

What is claimed is:

1. A characteristic extraction apparatus for a moving object, comprising:
   a map information database in which pre-determined map locations are recorded, each map location having a map position and information characterizing a real-world place located at the map position;
   a visit data acquisition unit acquiring visited map locations, by relating current positions of the moving object to the map positions to identify corresponding map locations, and acquiring situation data corresponding to the visited map locations when the moving object visits physical locations corresponding to the map positions of the visited map locations;
   a visit history database recording visit history data of the moving object, which relates the visited map locations with the corresponding situation data;
   a characteristic extracting unit extracting a characteristic of the moving object by analyzing the visit data of the moving object from said visit history database; and
   an extracted characteristic utilizing unit utilizing the extracted characteristic of the moving object.

2. The characteristic extraction apparatus for the moving object according to claim 1, wherein
   the situation data comprises time data, movement data, environment data and event data.

3. The characteristic extraction apparatus for the moving object according to claim 1, wherein
   said map information database comprises information in which locations are represented using a hierarchical category classification.

4. The characteristic extraction apparatus for the moving object according to claim 1,
   wherein the extracted and analyzed characteristic includes visitation frequency of the moving object.

5. The characteristic extraction apparatus for the moving object according to claim 1,
   wherein the map locations represent points of interest.

6. A characteristic extraction apparatus for a moving object, comprising:
   a map information database in which map information is recorded;
   a visit data acquisition unit acquiring location data from a current position of the moving object by referring to said map information database and acquiring situation data at a time when the moving object visits a location corresponding to the location data, wherein said visit data acquisition unit includes visit data acquisition condition setting unit setting a visit data acquisition condition in order to relate and record location data and situation data, and is configured in such a way that when the visit data acquisition condition is met, visit data can be obtained from the location data and situation data;

a visit history database relating and recording location data and situation data acquired by said visit data acquisition unit;

a characteristic extracting unit extracting a characteristic of the moving object by extracting data from said visit history database and analyzing extracted data; and an extracted characteristic utilizing unit utilizing an extracted characteristic of the moving object.

7. The characteristic extraction apparatus for the moving object according to claim 6, wherein a stay judgment condition for judging whether the moving object stays in a location can be set as a part of the visit data acquisition condition.

8. A characteristic extraction apparatus for a moving object, comprising:

a map information database in which map information is recorded, wherein said map information database includes an instruction inquiry processing unit executing at least one process of instructing a user to input data of an empty item and querying a user of the empty item when there is the empty item among items of location data which are requested to be used;

a visit data acquisition unit acquiring location data from a current position of the moving object by referring to said map information database and acquiring situation data at a time when the moving object visits a location corresponding to the location data;

a visit history database relating and recording location data and situation data acquired by said visit data acquisition unit;

a characteristic extracting unit extracting a characteristic of the moving object by extracting data from said visit history database and analyzing extracted data; and an extracted characteristic utilizing unit utilizing an extracted characteristic of the moving object.

9. A characteristic extraction apparatus for a moving object, comprising:

a map information database in which map information is recorded;

a visit data acquisition unit acquiring location data from a current position of the moving object by referring to said map information database and acquiring situation data at a time when the moving object visits a location corresponding to the location data;

a visit history database relating and recording location data and situation data acquired by said visit data acquisition unit;

a characteristic extracting unit extracting a characteristic of the moving object by extracting data from said visit history database and analyzing extracted data, wherein said characteristic extracting unit includes a setting unit setting a characteristic extraction rule, and is configured so as to extract a characteristic by analyzing data according to a set characteristic extraction rule; and an extracted characteristic utilizing unit utilizing an extracted characteristic of the moving object.

10. A characteristic extraction apparatus for a moving object, comprising:

a map information database in which map information is recorded;

a visit data acquisition unit acquiring location data from a current position of the moving object by referring to said map information database and acquiring situation data at a time when the moving object visits a location corresponding to the location data;

a visit history database relating and recording location data and situation data acquired by said visit data acquisition unit;

a characteristic extracting unit extracting a characteristic of the moving object by extracting data from said visit history database and analyzing extracted data; and an extracted characteristic utilizing unit utilizing an extracted characteristic of the moving object, wherein said extracted characteristic utilizing unit includes a utilization rule setting unit setting an extracted characteristic utilization rule, and is configured so as to execute a process utilizing a characteristic which is extracted according to a set extracted characteristic utilization rule.

11. A characteristic extraction apparatus for a moving object, comprising:

location data acquisition means for referring to pre-determined map information and acquiring location data from a current position of the moving object by correlating the current position with a pre-determined map location;

situation data acquisition means for acquiring situation data at a time when the moving object visits a location corresponding to the location data; and visit data acquisition means for obtaining visit data in order to extract a characteristic of the moving object based on acquired location data; and situation data, and transmitting the visit data.

12. A characteristic extraction apparatus for a moving object, comprising:

visit history database means for storing relation information relating location data which are acquired from a current position of the moving object by referring to map information and determining that the current position corresponds a position of a map location, to situation data at a time when the map location data is visited, and recording resulting data; and characteristic extracting means for extracting a characteristic of the moving object by extracting data including the relation information from said visit history database means and analyzing the extracted data.

13. A characteristic extracting method for a moving object, comprising:

measuring coordinates of the moving object;

extracting location data of a map location corresponding to the coordinates by collating measured coordinate data with map information database; and preparing situation data by measuring a situation at a time when the position is visited, relating the location data to the situation data, and recording and accumulating the resulting data as visit data; and extracting a characteristic of the moving object by analyzing accumulated visit data.

14. A computer-readable storage medium on which is recorded a program for causing a computer to extract a characteristic of a moving object, said program performing a process comprising:

referring to map information database and acquiring, by said referring a pre-determined map location corresponding to a current position of the moving object, where the map location represents a real-world point of interest;

acquiring situation data at a time when a location corresponding to the pre-determined map location is visited;

relating acquired pre-determined map location data to situation data, and recording and accumulating resulting data as visit data; and extracting a characteristic of the moving object by analyzing accumulated visit data.

* * * * *